Nov. 12, 1946.   W. R. KOCH   2,410,983
DISCRIMINATOR-RECTIFIER CIRCUIT
Filed April 1, 1944
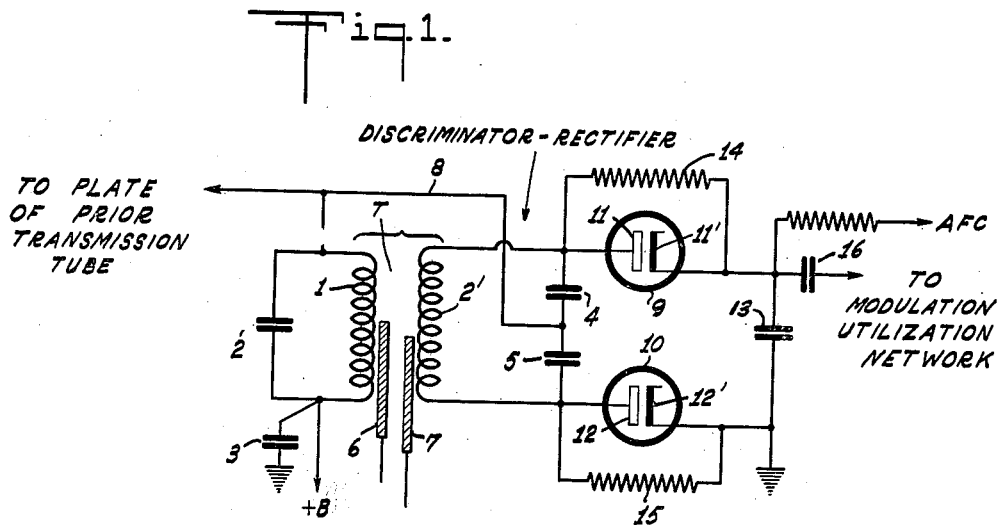
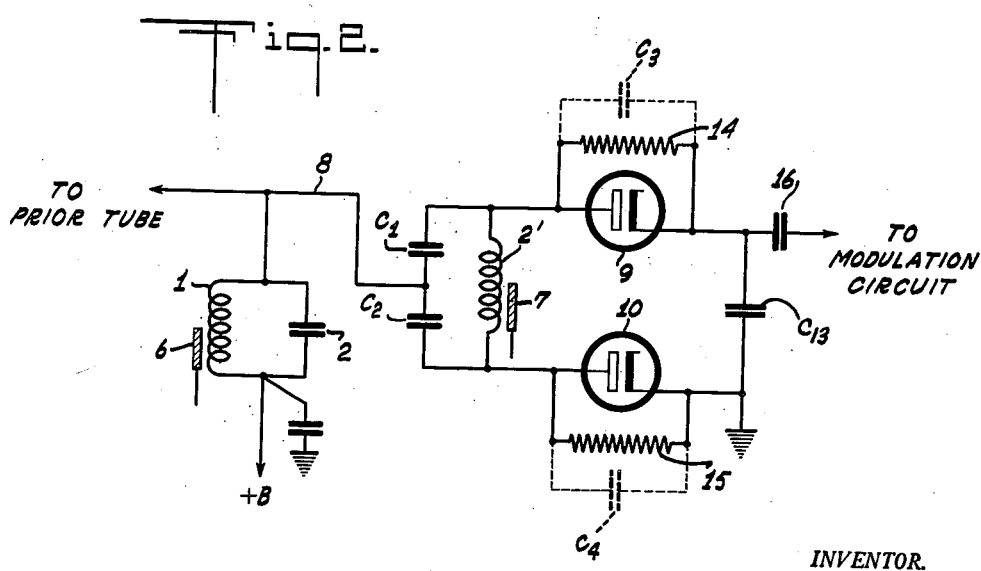
INVENTOR.
WINFIELD R. KOCH
BY
ATTORNEY.

Patented Nov. 12, 1946

2,410,983

UNITED STATES PATENT OFFICE 2,410,983

DISCRIMINATOR-RECTIFIER CIRCUIT

Winfield R. Koch, Haddonfield, N. J., assignor to Radio Corporation of America, a corporation of Delaware Application April 1, 1944, Serial No. 529,074

6 Claims. (Cl. 250—27)

My present invention relates to discriminator-rectifier circuits for frequency-variable waves, and more particularly to a novel and improved frequency modulation (FM) detector circuit.

The well known discriminator-rectifier circuit of the type disclosed and claimed by S. W. Seeley in U. S. Patent No. 2,121,103, granted June 21, 1938, employs a center-tapped secondary coil for the input transformer of the opposed signal rectifiers. This center-tapping is disadvantageous to the employment of inductance tuning by a relatively movable core, because the core, usually of comminuted iron, entering one end of the secondary coil causes the inductances of the two halves of the secondary to be unequal. Furthermore, a radio frequency choke coil is employed in the patented circuit from the center-tapping point on the secondary to the rectifier load circuit. Again, a direct current blocking condenser is employed in the aforesaid circuit between the secondary center-tap point and the high potential terminal of the primary winding.

It is an object of my invention to provide a highly effective arrangement functioning in like manner to the aforesaid Seeley discriminator circuit, yet not requiring a center-tapping point on the secondary coil or the aforesaid radio frequency choke coil or its equivalent.

Another object of my invention is to provide an improved form of frequency modulated wave discriminator-rectifier circuit employing a minimum number of circuit components.

A further object of my invention is to provide an improved form of frequency modulation discriminator-rectifier circuit which is well-suited for inductance tuning of the input transformer windings.

A more specific object of my invention is to provide a novel arrangement of the opposed rectifiers in a discriminator-rectifier network, each rectifier having its space current path directly shunted by its respective load resistor, and a single radio frequency bypass condenser being connected between the rectifier cathodes.

Other features will best be understood by reference to the following description, taken in connection with the drawing, in which I have indicated diagrammatically two circuits whereby my invention may be carried into effect.

In the drawing Figs. 1 and 2 show two embodiments of the invention.

Referring now to the accompanying drawing, wherein like reference characters in the two figures indicate similar circuit elements, I have only shown so much of the circuits of an FM receiver system as is essential to a proper understanding of the invention. The discriminator-rectifier network of my present invention is not restricted in its utility to FM reception, since it may be employed to provide automatic frequency control (AFC) voltage for the local oscillator of a superheterodyne receiver of amplitude modulated (AM) carrier waves. The aforesaid Seeley patent shows the manner of this application of the invention. My circuit is also adapted to detect phase modulated waves. The particular frequency ranges or specific operating frequencies referred to hereinafter are to be understood as being purely illustrative. Further, the generic term "angle modulated wave" as used herein is to be understood as including a frequency modulated wave, a phase modulated (PM) wave or related forms of modulation. An FM wave is produced by deviating the carrier wave relative to its mean frequency to an extent proportional to the amplitude of the modulating frequency, and a PM wave differs in having a frequency deviation which increases with modulating frequency. The above generic expression is also intended to include a modulated wave of constant amplitude wherein the modulation is neither pure FM nor pure PM, but contains common components and is, therefore, a hybrid modulation.

My improved discriminator-rectifier circuit may be embodied in various well-known forms of receivers. For example, it may be assumed to be employed in a superheterodyne receiver adapted to be operated in the presently-assigned FM band of 42–50 megacycles (mc.), and it is to be understood that the networks prior to transformer T are of well-known construction. The FM waves, which may have a frequency deviation up to a maximum of 75 kilocycles (kc.) on either side of the transmitter carrier frequency, are collected by the signal collector device and, with previous amplification if desired, converted to an intermediate frequency (I. F.) by any well-known conversion circuit. Any desired operating I. F. value may be used such as, for example, 4.3 mc. After I. F. amplification the FM energy, having a mean frequency of 4.3 mc., may be subjected to amplitude limiting in order to remove any amplitude modulation which may have arisen during the course of wave propagation and reception.

Referring to the drawing, the primary winding or coil 1 of transformer T derives FM waves from any suitable source. It may be connected in the plate circuit of the final I. F. amplifier tube or the amplitude limiter tube of the superheterodyne receiver. A condenser 2 is connected in shunt with coil 1 to provide the primary resonant circuit of the discriminator. As shown, the upper end of coil 1 is adapted to be connected to the plate of the prior transmission tube, whereas the lower end of the coil is connected to the usual +B terminal of the direct current energizing source. The +B lead is bypassed to ground for intermediate frequency currents by condenser 3. The secondary coil 2' is magnetically coupled to coil 1, and is shunted by condensers 4 and 5 arranged in series. Thus, circuit 2'—4—5 is the resonant secondary circuit of the discriminator. Each of coils 1 and 2' is preferably of the inductance tuner type.

Those skilled in the art of radio receiver construction are fully acquainted with the manner of adjusting the inductance value of a coil by means of an adjustable iron core. The numeral 6 designates the iron core or plug adapted to adjust the inductance value of coil 1, while numeral 7 indicates the corresponding adjustable iron core for selecting the inductance value of coil 2'. In general, the iron plugs or trimmers 6 and 7 will be individually adjusted so that each of the primary and secondary circuits is tuned to the operating I. F. value, which has been stated by way of example as being 4.3 mc.

Coil 2' may have its inductance selected so as to be double the inductance value of coil 1 at the normal resonant condition of the two circuits including them. The condensers 4 and 5 are equal in magnitude, and may, for example, be each 33 micromicrofarads (mmf.), while condenser 2 may also be given a like value of 33 mmf. With these values for the condenser elements 4 and 5, the inductance of coil 2' at twice the value of the inductance of coil 1 will provide a resonant frequency for the secondary circuit which is substantially equal to the resonant frequency of the primary circuit.

Unlike the aforesaid discriminator circuit of the Seeley patent, the high potential side of primary circuit 1—2 is connected by lead 8 to the junction of condensers 4 and 5. This will result in establishing the junction point at the same alternating potential as the high potential side of the primary circuit. At the same time each of condensers 4 and 5 will function as a direct current blocking condenser to prevent application of +B voltage to the opposed rectifiers 9 and 10. The condensers 4 and 5 offer a low impedance to the I. F. voltage at the primary so that substantially the full value of primary voltage is applied to the diode anodes.

The rectifiers are shown by way of example as diodes, and it is to be clearly understood that they may have their electrodes embodied in a common envelope as in the 6H6 type of tube. The anode 11 is connected to the upper terminal of condenser 4 and to the upper end of coil 2', whereas the anode 12 of diode 10 is connected to the lower terminal of condenser 5 and to the lower end of coil 2'. The cathodes 11' and 12' of diodes 9 and 10 respectively are connected by a condenser 13. The cathode 12' and low potential terminal of condenser 13 are established at ground potential. Condenser 13 may be given a magnitude of approximately 33 mmf., but may be of larger capacity if desired. Numeral 14 designates the load resistor operatively associated with rectifier 9, and the load resistor is connected directly in shunt with the space current path of the diode. Similarly load resistor 15 is connected directly between the anode and cathode of its diode 10, and it is, therefore, directly in shunt with the space current path of that diode.

There will be developed across each of resistors 14 and 15 respective voltages produced by rectification of signal currents. It will be noted that the rectified voltages developed across resistors 14 and 15 will be added in polarity opposition by virtue of the fact that the anode ends of resistors 14 and 15 are connected together through the coil 2'. The differentially added rectified voltages are taken off from the cathode end of resistor 14. The modulation or audio frequency component of the rectified voltage may be utilized in any desired form of modulation utilization network by transmitting the audio frequency component through the coupling condenser 16. The direct current voltage component of the rectified voltage may be employed for AFC in accordance with the teachings of the aforesaid Seeley patent. Each of resistors 14 and 15 may have a magnitude of about 150,000 ohms. The condenser 13 functions as an intermediate frequency bypass condenser from cathode 11' to ground, and will, therefore, bypass to ground all intermediate frequency currents transmitted through diode 9. Hence, the diode 9 has full intermediate frequency voltage applied across it. The condneser 13 offers a high impedance to ground for audio voltages so that they are not attenuated.

The functioning of a discriminator of the general type disclosed herein has been explained in the aforesaid Seeley patent. However, in order to present clearly the advantages of the improvement in the present circuit, its manner of operation will be further explained. Let us first assume that the FM energy applied to the primary circuit 1—2 is instantaneously at the mean or carrier frequency of 4.3 mc. The condensers 4 and 5 through which signal energy is fed to each of anodes 11 and 12 are of low reactance, and any phase shift of the signal energy produced by them will be negligible. Also the signal energies applied through condensers 4 and 5 will be of like polarity. However, the anodes 11 and 12 are also connected to the opposite ends of coil 2'. Due to the magnetic coupling between the tuned circuits containing coils 1 and 2', there will occur a 90° phase shift at the instantaneous carrier frequency. Hence, the signal energy will be applied to anodes 11 and 12 from respective ends of coil 2' in opposite polarity, but in each case in phase quadrature with the signal energy which was applied through condensers 4 and 5. It follows, therefore, that the resultant signal voltages effectively applied to anodes 11 and 12 will be equal at the instantaneous carrier frequency, and the rectified voltages across respective resistors 14 and 15 will be of equal magnitude. Since these voltages are added in opposition, the result will be that at the instant when the signal energy is at the predetermined frequency of each of the primary and secondary circuits the potential at the cathode end of resistor 14 will be zero relative to ground.

Assuming, now, that at some later instant the signal energy has a frequency different from the predetermined mean frequency of the applied waves, which is also the predetermined frequency of the primary and secondary circuits of transformer T, there will now occur a phase shift in the signal energy transmitted through the tuned transformer T which is greater or less than 90°, depending upon the direction and extent of frequency difference between the instantaneous frequency of the applied signal energy and the predetermined resonant frequency of the tuned primary and secondary circuits. The signal energy transmitted in parallel through condensers 4 and 5 will have suffered no relative phase shift due to the non-selective phase shift character thereof. That is to say, the signal energy applied through condensers 4 and 5 to the anodes 11 and 12 suffers no phase shift, which need be taken into account, relative to the phase at the instantaneous carrier frequency, whereas the signal energy transmitted through transformer T undergoes a variable phase shift from the normal quadrature phase relation depending upon the direction and amount of instantaneous frequency deviation of the signal energy with respect to the carrier frequency.

This means that there will be applied to the anodes 11 and 12 resultant signal voltages of different magnitudes, as is well-known to those skilled in the art. Hence, the rectified voltages across resistors 14 and 15 will be of different magnitudes, and the differential voltage at the cathode end of resistor 14 will be of a magnitude and polarity dependent respectively upon the extent and sense of frequency deviation of the signal energy with respect to the predetermined mean frequency. The relatively rapid rate of frequency deviation of the signal energy corresponds to the modulation voltage which is transmitted on through condenser 16, whereas any slow departure of the mean frequency of the signal energy with respect to the predetermined reference frequency of the primary and secondary circuits of transformer T will show up as AFC voltage. If desired, a de-emphasis network may be used subsequent to the condenser 16 so as to compensate for any pre-emphasis which may exist at the higher modulation frequencies, and in the latter case the network could be employed for the reception of PM waves. Condenser 13 may be made large enough to give the desired de-emphasis, instead of using a separate network.

In Fig. 2 there is shown a modification of the circuit of Fig. 1, wherein the primary and secondary circuits 1—2 and 2'—C₁—C₂ are coupled by the lead 8 connecting to the junction of the series-arranged condensers C₁ and C₂. This method of coupling replaces the usual magnetic coupling between coils 1 and 2' of Fig. 1. It will be understood that capacitors C₁ and C₂ of Fig. 2 correspond respectively to condensers 4 and 5 of Fig. 1. The inherent capacities between the anode and cathode of each diode are represented by dotted capacities C₃ and C₄. The circuit of Fig. 2 is otherwise the same as that shown in Fig. 1.

If the two capacitors C₁ and C₂ across secondary coil 2' are not of equal value, or alternatively if the capacities C₃ and C₄ of respective diodes 9 and 10 are unequal, there will exist capacity coupling between the primary and secondary circuits. If the percentage coupling needed is small, as when a high I. F. value is used (or in the case of small FM deviation range), all the necessary coupling between the primary and secondary circuits may be secured by adjusting the capacitors C₁ or C₂. Further, if the diode capacities C₃ and C₄ are unequal, capacity coupling can be prevented by choosing the capacitors C₁ and C₂ so that a balance is secured. Capacity coupling between the primary and secondary circuits is balanced out when $$\frac{C_1}{C_2} = \frac{C_3}{C_4}$$

even when C₁ is not equal to C₂.

This may be shown by reference to Fig. 2, in which it will be seen that currents caused by the voltage of the primary circuit have two paths. One is through C₁, C₃, and C₁₃. The other is through C₂ and C₄. Because C₁₃ is large, the voltage drop across it is small, and can be neglected. When the condensers have the ratios given above, the junction of C₁ and C₃ will be at the same potential as the junction of C₂ and C₄. No current will flow through coil 2', and the secondary voltage is therefore zero. When an unbalance of the capacitors occurs, current will flow through the coil thereby causing a voltage which will be large for frequencies near resonance of the secondary. The resonant frequency of the secondary depends on the inductance of coil 2', and the effective capacity across it. This effective capacity is:

$$\frac{C_1 C_2}{C_1 + C_2} + \frac{C_3 C_4}{C_3 + C_4}$$

A capacity coupling between the primary and secondary circuits is then present, and portions of the secondary circuit voltage are applied to the two diodes. Although the secondary voltages applied to the diodes are not quite equal to each other, when the damping is small the necessary coupling can be secured with a very small unbalance. This unbalance changes the operation of the discriminator a relatively unimportant amount.

While I have indicated and described two systems for carrying my invention into effect, it will be apparent to one skilled in the art that my invention is by no means limited to the particular organizations shown and described, but that many modifications may be made without departing from the scope of my invention.

What I claim is:

1. In a discriminator-rectifier circuit, a first resonant circuit comprising a coil and a pair of series-connected condensers arranged in shunt with the said coil, a second resonant circuit having a normal frequency equal to the normal frequency of the first resonant circuit, means magnetically coupling said two resonant circuits, conductive means free of reactance components connecting one side of said second circuit to the junction of said pair of condensers, said coil being free of any tapping point along the length thereof, a first diode rectifier having its anode connected to one end of said coil, a second diode rectifier having its anode connected to the opposite end of said coil, a first load resistor connected in shunt to one of said rectifiers and directly between its anode and cathode, a second load resistor connected in shunt with the second rectifier and directly between its anode and cathode, means for establishing the cathode end of one of said load resistors at a relatively fixed potential, solely a single condenser connecting the cathodes of said rectifiers, and voltage utilizing means connected to the cathode end of the other load resistor.

2. In combination with a pair of diodes, a separate input terminal connected to a respective anode of each of said diodes, a frequency discriminator network of the type comprising coupled resonant circuits free of capacity coupling, said discriminator network being coupled to said input terminals and being adapted to develop at said input terminals signal voltages of relatively different magnitudes whose magnitude difference is a function of frequency variation with respect to a predetermined reference frequency, solely a high frequency bypass condenser coupling the cathodes of said diodes, means connecting the cathode of one diode to ground, a first resistor connected directly between anode and cathode of one diode, a second resistor connected directly between the anode and cathode of the second diode, each of said resistors developing a rectified voltage from rectified diode current, and means connected to the ungrounded cathode for providing a rectified voltage which is the differential of the rectified voltages across said load resistors.

3. In a frequency discriminator system, a first circuit comprising a coil and a condenser tuned to a predetermined signal frequency, a second circuit comprising a second coil shunted by a pair of series-arranged capacitors, the second circuit being tuned to said predetermined frequency, said coils being magnetically coupled, a direct connection from one side of the first tuned circuit to the junction of said two capacitors, a pair of diodes, said second coil being entirely free of any tapping point along its length, each diode having its anode connected to a respective end of the second coil, separate resistors of equal magnitude respectively shunting said diodes directly between the anode and cathode thereof, means grounding the cathode of one diode, a condenser of low impedance to signal currents connecting the cathode of the second diode to ground, said last condenser being the sole connection between the diode cathodes, and a modulation utilization circuit connected to the junction of the last named cathode and condenser.

4. In combination, a primary circuit, means for supplying frequency modulated carrier energy thereto, a secondary circuit resonant to the mean frequency of said carrier energy and comprising a coil and a pair of series-connected condensers arranged in shunt with said coil, said circuits being inductively coupled with each other, means conductively connecting an alternating current potential point on the primary circuit to the junction of said pair of condensers, a diode rectifier having its anode connected to one end of said coil and to one of said pair of condensers, a second diode rectifier having its anode connected to the opposite end of said coil and to the other of said pair of condensers, a first load resistor connected in shunt to one of said rectifiers and directly between the anode and cathode thereof, a second load resistor connected in shunt with the second rectifier and connected directly between the anode and cathode thereof, means for establishing the cathode end of one of said load resistors at a relatively fixed potential, a capacitance of low impedance to signal currents providing the sole connection between the cathodes of said rectifiers, and voltage utilizing means connected to the cathode end of the other load resistor.

5. In combination with a pair of diodes, a separate input terminal connected to a respective anode of each of said diodes, a frequency discriminator network composed of at least two coupled resonant circuits free of capacity coupling, said network being coupled to said input terminals and being adapted to develop at said input terminals signal voltages of relatively different magnitudes whose magnitude difference is a function of frequency variation with respect to a predetermined reference frequency, a condenser of low impedance to signal currents constituting the sole coupling between the cathodes of said diodes, means connecting the cathode of one diode to ground, a first resistor connected directly between anode and cathode of one diode, a second resistor connected directly between the anode and cathode of the second diode, said resistors being of equal value, each of said resistors developing a rectified voltage from rectified diode current, and means connected to the ungrounded cathode for providing a rectified voltage which is the differential of the rectified voltages across said load resistors.

6. In a system as defined in claim 4, the improvement which comprises said last-mentioned capacitance having a magnitude sufficient to provide de-emphasis at the higher modulation frequencies.

WINFIELD R. KOCH.